United States Patent [19]

Jeppson

[11] 4,246,461
[45] Jan. 20, 1981

[54] INDUCTION WELDING APPARATUS FOR PLASTIC CONTAINERS

[75] Inventor: Jan-Bertil Jeppson, Lomma, Sweden

[73] Assignee: AB Akerlund & Rausing, Sweden

[21] Appl. No.: 954,624

[22] Filed: Oct. 25, 1978

[30] Foreign Application Priority Data

Oct. 25, 1977 [SE] Sweden .................. 7711972
Apr. 10, 1978 [SE] Sweden .................. 7803976

[51] Int. Cl.³ .................. B23K 13/02; H05B 6/10
[52] U.S. Cl. .................. 219/10.53; 219/10.71; 219/10.73; 219/10.49 R; 156/380; 156/69
[58] Field of Search ........... 219/10.53, 10.49, 10.57, 219/10.61, 10.67, 10.69, 10.71, 10.73, 10.75, 10.41, 10.81; 156/380, 272, 273, 359, 69; 53/329

[56] References Cited

U.S. PATENT DOCUMENTS

| | | | |
|---|---|---|---|
| 2,575,381 | 11/1951 | Colby | 219/10.53 |
| 2,920,173 | 1/1960 | Wästberg | 219/10.53 |
| 3,057,988 | 10/1962 | Roder | 219/10.53 |
| 3,185,810 | 5/1965 | Peschel et al. | 219/10.69 |
| 3,426,564 | 2/1969 | Jansen et al. | 53/329 X |
| 3,748,207 | 7/1973 | Campbell et al. | 156/359 |
| 4,075,820 | 2/1978 | Standley | 53/329 |
| 4,095,390 | 6/1978 | Knudsen | 156/272 |
| 4,152,566 | 5/1979 | Mägerle | 219/10.53 |

FOREIGN PATENT DOCUMENTS

| | | | |
|---|---|---|---|
| 2606474 | 8/1976 | Fed. Rep. of Germany. | |
| 320785 | 2/1970 | Sweden | 219/10.53 |
| 1130840 | 10/1968 | United Kingdom | 219/10.53 |
| 1501873 | 2/1978 | United Kingdom | 219/10.75 |

Primary Examiner—Roy N. Envall, Jr.
Assistant Examiner—Philip H. Leung
Attorney, Agent, or Firm—Lerner, David, Littenberg & Samuel

[57] ABSTRACT

Apparatus for welding items which are each made from a plurality of substantially plastic components operate to maintain the components in fixed positions relative to each other while moving them along a feed path, including welding and cooling stages.

9 Claims, 11 Drawing Figures

INDUCTION WELDING APPARATUS FOR PLASTIC CONTAINERS

FIELD OF THE INVENTION

The present invention relates to apparatus for welding, and, more particularly, to a unique method and apparatus useful in the induction welding of plastic components.

BACKGROUND OF THE INVENTION

In the past, welding tools have been cooled, during an actual welding operation, in order to dissipate heat from the welded area of an item. That type of cooling, however, does not permit complete equalization of temperature in the welded area of the item, especially where such items are made from a relatively thick material, such as plastic, having poor heat-conducting properties. If temperature equalization is not achieved, any resulting temperature difference existing in the material after the welding operation may be sufficient to cause shrinkage deformation, even though the peak value of the temperature was lowered by direct cooling in the welding tool during the welding operation.

SUMMARY OF THE INVENTION

The present invention overcomes all of the problems and disadvantages of the prior art devices discussed above by providing a new and improved apparatus for induction welding of items which are made from a plurality of substantially plastic components. In accordance with the invention, the components are supported in fixed positions relative to each other while moving them along a feed path, including welding and cooling stages. During the cooling stage, the fixed positions of the components are maintained until their welded areas reach a predetermined low temperature which is less than the temperature that the welded areas normally reach during welding and sufficiently low to inhibit shrinkage deformation.

By continuously moving the components along the feed path during the welding and cooling stages, it is possible to maintain a high feed rate. The rate of feed can be increased by simultaneously performing welding operations on a number of sets of components during their continuous movement along the feed path. The rate of feed can be further increased by successively feeding the sets.

BRIEF DESCRIPTION OF THE DRAWINGS

For a better understanding of the invention, reference may be had to the following detailed description of three exemplary embodiments, taken in conjunction with the figures of the accompanying drawings, in which.

DESCRIPTION OF EXEMPLARY EMBODIMENTS

Figure 3:
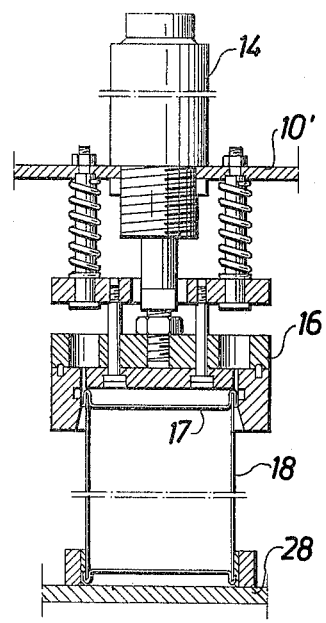
FIG. 3, is a cross-sectional view, taken along line 3—3 of FIG. 1 and looking in the direction of the arrows, of the device shown in FIG. 1.
Figure 4:
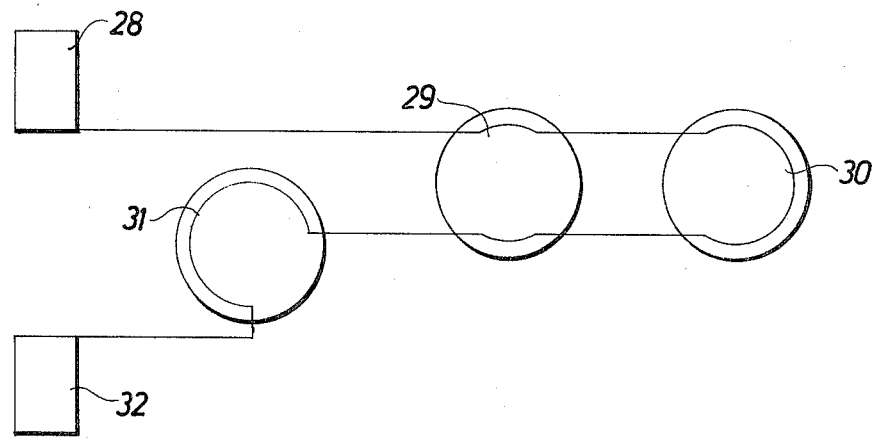
FIG. 4 is a schematic diagram of a machine line in which the present invention may be utilized.

Referring to FIG. 4, there is shown a packaging line in which the method and apparatus of the present invention may be utilized. At unpacking station 28, individual packages are unpacked and transported further down the line to the next station 29. In a first region of the station 29, the bottoms of the individual packages are removed. Thereafter, the individual packages are washed and transported further to a filling station 30. The packages then return to the station 29 where the previously removed bottoms are mounted. The individual packages are now ready to be supplied to a sealing station 31. This sealing station preferably is a station where the devices illustrated in FIGS. 1-3 and 5-11 and described hereinbelow may be employed. After being sealed in the station 31, the packages are transported to a station 32 for a further operation such as retorting.

Figure 1:
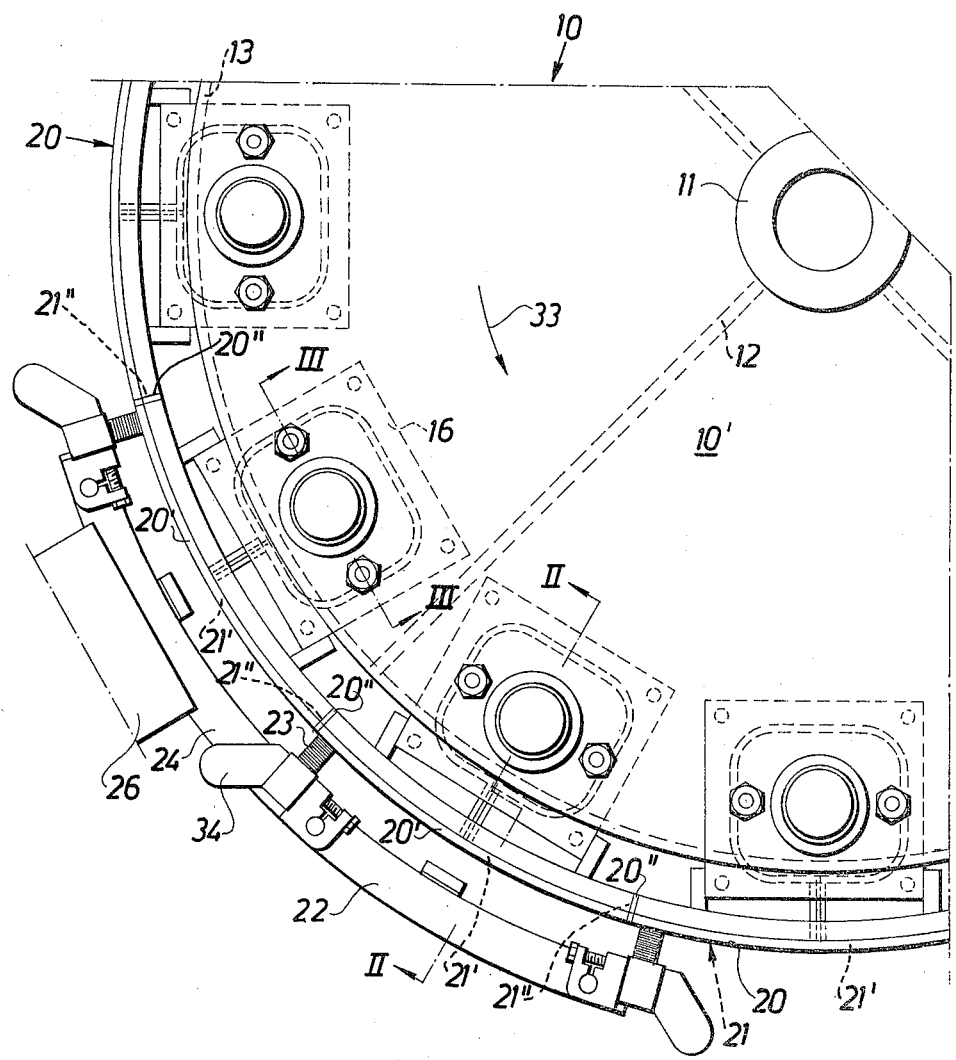
FIG. 1 is a top view of a portion of a welding device constructed in accordance with the present invention.
Figure 2:
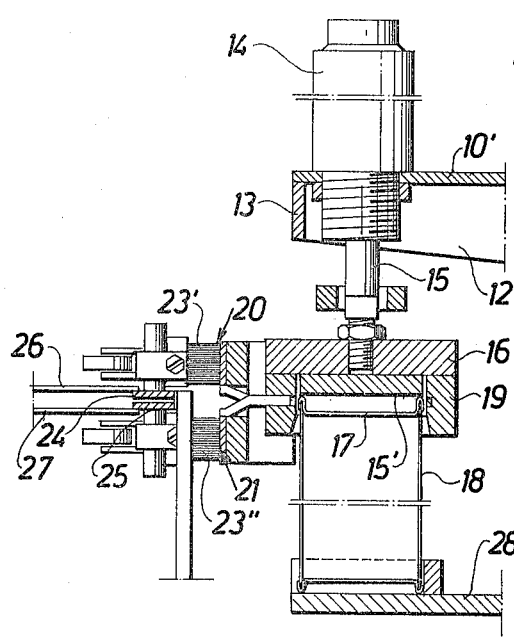
FIG. 2 is a cross-sectional view, taken along line 2—2 of FIG. 1 and looking in the direction of the arrows, of the device illustrated in FIG. 1.

Referring now to FIGS. 1-3, the reference numeral 10 generally denotes a table which is rotatable about a shaft 11. The table 10 includes a circular upper plate 10' and a number of radially extending reenforcing ribs 12. A vertically depending skirt 13 extends around the periphery of the plate 10', the ribs 12 being attached to the skirt 13. A number of cylinders 14 are spaced equidistantly along the periphery of the plate 10', each of the cylinders 14 adjustably supporting a corresponding plunger 15. Each of the plungers 15 is connected to a corresponding induction welding tool 16 which is adapted to weld a top 17 to a sleeve-shaped casing 18 to form a closed container. In a known manner, each of the welding tools 16 has a pipe loop 19 which extends around the top of the container 18. This loop 19 is electrically connected to a pair of copper rails 20, 21 extending around the outer circumferential edge of the table 10.

As shown in FIG. 2, the rails 20, 21 are divided into segments 20', 21' of equal length. Adjacent segments 20' are insulated from each other at 20". Similarly, adjacent segments 21' are insulated from each other at 21". The vertical position of each of the associated pairs of rail segments 20', 21' may be adjusted vertically by a corresponding one of the plungers 15. Guides (not shown) control the movement of the rail segments 20', 21' during such vertical adjustment.

A stationary manifold 22 supports three pairs of coal brushes 23. Each pair of brushes 23 is mounted in a bracket 34 and includes an upper brush 23' and a lower brush 23". The brushes 23' and 23" are connected by rails 24, 25, respectively, and connection plates 26, 27, respectively, to a high frequency source (not shown).

In FIG. 3, it is shown how an individual tool 16 is supported by a corresponding cylinder 14 and the plate 10'. More particularly, each of the plungers 15 is threadedly received in a corresponding one of the cylinders 14, so that each of the plungers 15 can be adjusted independently of the other plungers 15. By adjusting the position of a plunger 15 relative to its corresponding one of the welding tools 16 and the rail segments 20', 21' associated therewith are raised or lowered relative to a container formed by the top 17 and casing 18 and supported by a support plate 28 having a fixed position with respect to the plate 10' but rotatable therewith.

In operation, the table 10 rotates with a constant velocity in the direction of the arrow 33. In an input station (not shown), a container formed by the top 17 and the casing 18 are inserted in a corresponding one of the welding tools 16, so that when the welding tool 16 and its associated pair of rail segments 20', 21' reach the first coal brush pair 23, the top 17 and casing 18 have already been placed in the welding tool 16 with the casing and lid maintained in a fixed position relative to each other by means of an end 15' of a corresponding plunger 15 and, for instance, the frictional engagement of the peripheral edge of the top 17 with the inner sidewall of the welding tool 16. As soon as the leading edge of the corresponding rail segments 20', 21' reach the first coal brush pair 23, the electrical connection to the high frequency generator (not shown) is closed and the supply of electrical energy to the associated welding tool 16 begins. In the device shown in FIGS. 1–3, the energy supply is carried out simultaneously to three welding tools 16 by having the spacing between the three pairs of coal brushes 23 equal to the spacing between insulating locations 20" and 21". Of course, it should be understood that other spacings may be selected.

In FIG. 1, the welding operation through the leading set of rails 20', 21' is about to terminate. As soon as the trailing edge of the rail segment 20' passes the last pair of coal brushes 23, the energy supply to the rail segments 20' and 21' and thereby also to their corresponding welding tool 16 is interrupted. After termination of the welding operation, there follows a cooling stage which is of sufficient duration to permit the temperature of the welding device 16 to reach a predetermined low temperature which is less than the temperature that the welding tool 16 normally reaches during the welding operation. The duration of the cooling stage is also selected so as to permit temperature equalization in the different layers of the welded components, for instance in the thicker plastic layer of the top 17 which may also comprise a thin aluminum foil layer useful in the induction welding operation for the purpose of providing an eddy current creating material in the area to be welded. As mentioned above, the main object of this cooling stage is to prevent shrinkage deformation, especially when the bottom 17 has a peripheral flange. During the entire cooling stage, the welding tool 16 is maintained in a lower position by means of the end 15' of the plunger 15. The top 17 and its corresponding casing 18 are therefore fixed as to position relative to each other during the entire cooling stage. As soon as the necessary cooling has been obtained, the end 15' of the plunger 15 and therefore the welding tool 16 can be raised. Preferably this raising operation is carried out on the way to a discharge station (not shown) for the individual welded packages. The previously mentioned supply station (not shown) follows the discharge station (not shown) in the direction of the rotation of the table 10.

Figure 6:
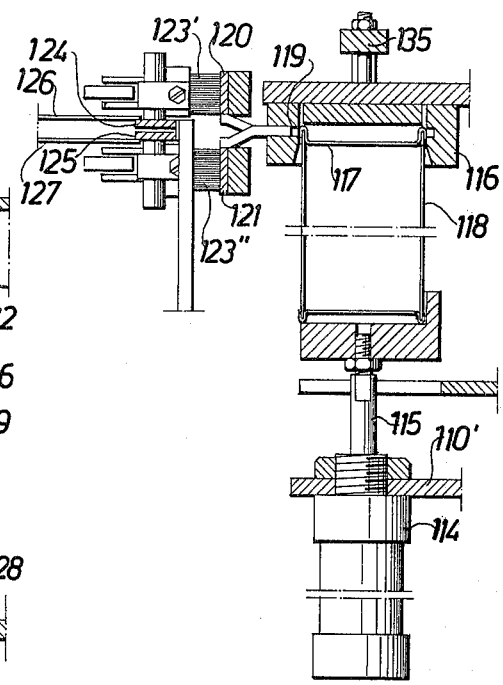
FIG. 6 is a cross-sectional view, taken along line 6—6 of FIG. 5 and looking in the direction of the arrows, of the device shown in FIG. 5.
Figure 7:
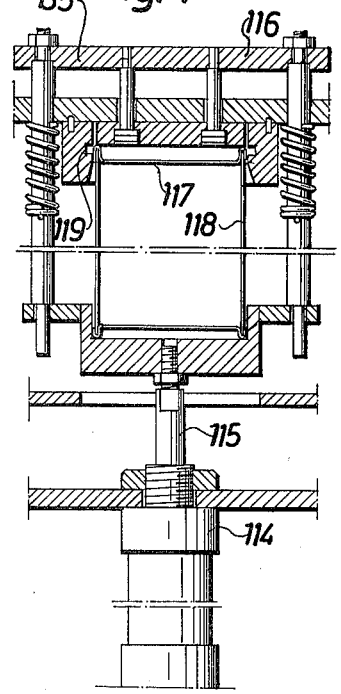
FIG. 7 is a cross-sectional view, taken along line 7—7 of FIG. 5 and looking in the direction of the arrows, of the welding device illustrated in FIG. 5.
Figure 5:
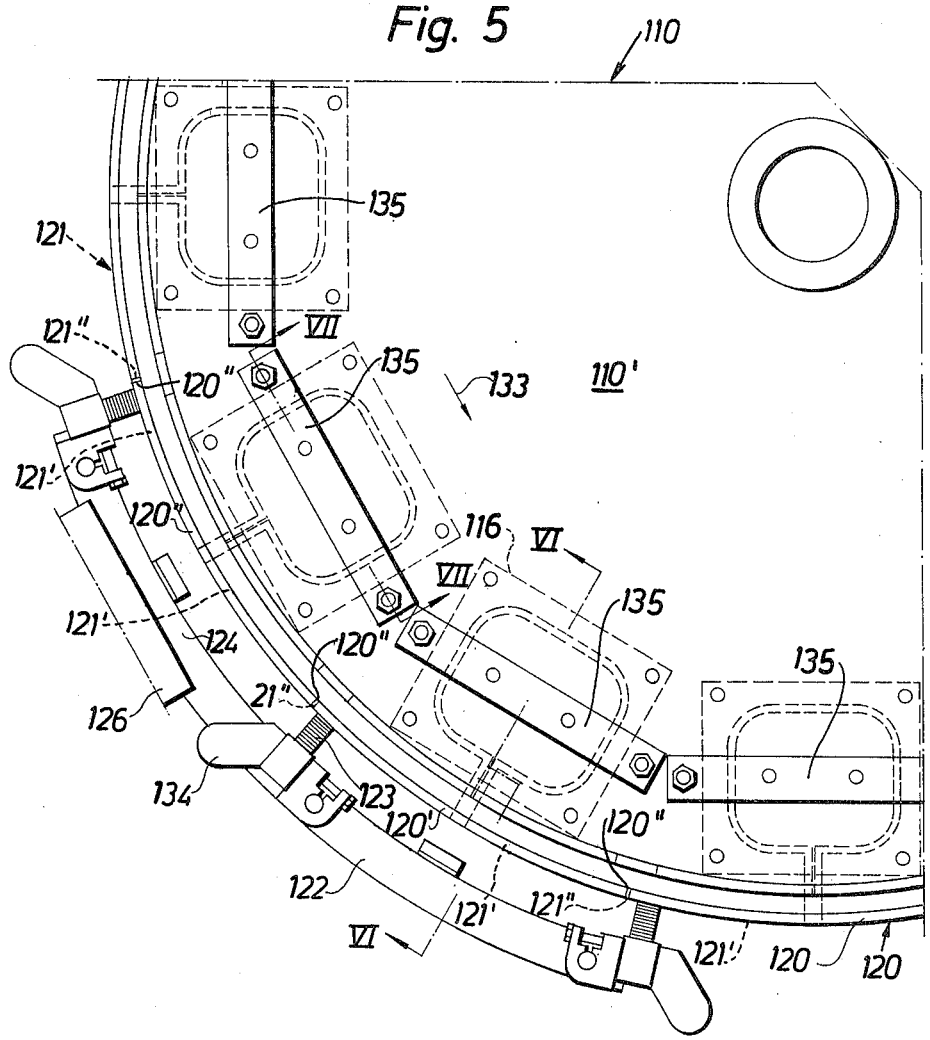
FIG. 5 is a top view of a portion of another embodiment of a welding device constructed in accordance with the present invention.
Figure 8:
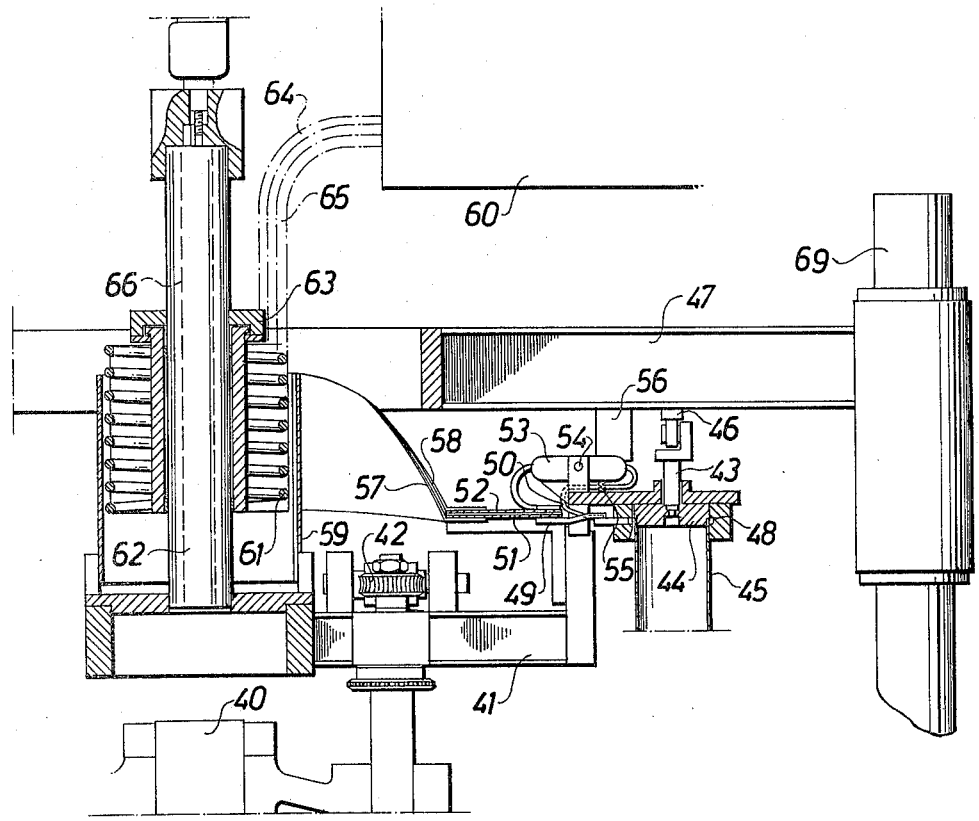
FIG. 8 is a partial cross-sectional view of a third embodiment of a welding device constructed in accordance with the present invention.
Figure 9:
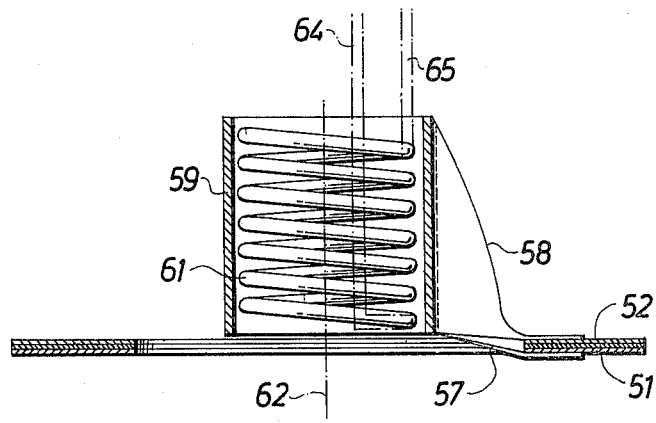
FIG. 9 is a detailed cross-sectional view of the output coil of the welding generator used in the embodiment of FIG. 8.
Figure 10:
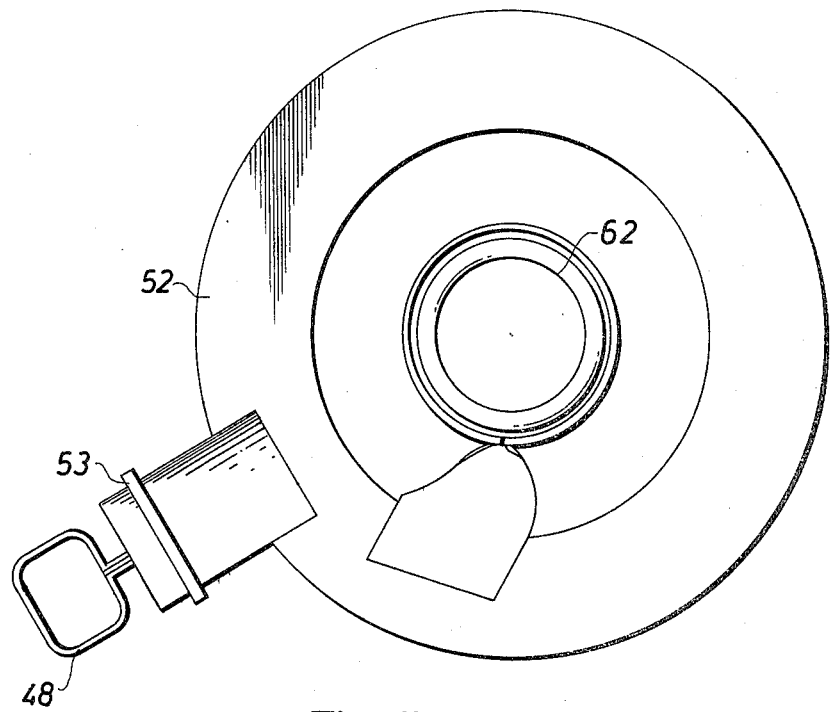
FIG. 10 is a top view of the embodiment of FIG. 8.
Figure 11:
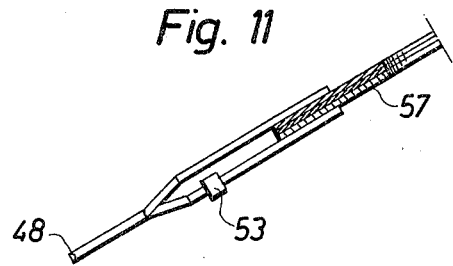
FIG. 11 shows the welding tool and the electric connections therefor in greater detail.

Referring now to FIGS. 5–7, there is shown an alternate embodiment of the present invention. The various elements illustrated in FIGS. 5–7 which correspond to elements described above with respect to FIGS. 1–3 have been designated by corresponding reference numerals, incresed by 100. Unless otherwise stated, the embodiments of FIGS. 5–7 operate in the same manner as the embodiment of FIGS. 1–3.

The main difference between the embodiment of FIGS. 5–7 and the embodiment of FIGS. 1–3 is in the mechanism for fixing the position of the tops 17 and casings 18 to be welded. In the embodiment of FIGS. 5–7, and tops 17 and casings 18 are arranged above the plate 10', rather than below it. The upper end of the container is mounted in a fixed position by bracket plates 135 which are vertically adjustable either individually or as a group.

As an alternative to the energy supply system of the embodiment shown in FIGS. 1–3 and 5–7, it is also possible in accordance with the present invention to use an inductive transfer technique. Broadly, this technique implies that energy for the welding tools is obtained inductively and that the output coil, still inductively coupled to the supply coil, of a high frequency generator is caused to rotate with the welding tools, the energy supply to the individual tools being controlled in relation to the rotational position of sensing switches associated with the welding tools. Preferably, the output coil is arranged centrally around the axis of rotation of the table, and for each one of the tools there is arranged a switch which is closed during a predetermined angle of rotation of the table and thereafter opened, the switch being arranged in the electrical circuit of a respective welding tool. The switch may be controlled by a tripping mechanism which is placed in the rotational path of the switch or a member effecting the switch, which can be a position sensitive mercury switch.

With reference to FIGS. 8–11, a table 41 is rotatably mounted about a shaft 40. An adjustable worm device 42 permits vertical adjustment of the welding table 41 for setting the vertical position of a plunger 43 having a depending portion 44 (corresponding to the plunger end 15' described hereinabove) designed to be guided downwardly for sealing a top or bottom to a container 45 which is shown schematically in the shape of a casing. The portion 44 of the plunger 43 is guided by a cam surface 46 attached to a stationary beam 47 which is supported by vertical posts 69.

For induction welding of the top or bottom to the container casing 45, a welding loop 48 is used. The loop 48 has two connections 49 and 50, respectively. The connection 49 is directly connected electrically to a conducting plate 51, which is electrically connected to the connection 50 by a mercury switch 53 which is rotatable about a shaft 54 and is urged into a horizontal position by a spring 55. The switch 53 is actuated by a tripping mechanism 56 on the beam 47. This tripping mechanism 56 is actually arcuate in shape and has been shown schematically in FIG. 8 to indicate that when a welding tool 48' is in the position shown in FIG. 8, the switch 53 is unaffected and maintains the supply circuit to the tool in an open condition. The plates 51, 42 are electrically connected by a couple of connection strips 57, 58 to the two poles of an outer coil 59 of an output of a high frequency generator 60. The outer coil 59 is inductively supplied by an inner coil 61 from the generator 60. The inner coil 61 is fixedly supported around a rotatable shaft 62 by a bearing 63. The inner coil 61 is supplied by a pair of electrical conductors (not shown) encased in pipes 64 and 65. The shaft 62 contains a number of passages 66 for supplying cooling medium to the welding tools 48'.

In operation, when the shaft 40 rotates, the output coil 59 of the generator 60 follows the rotational movement together with the tools 48' and electrical connections between the coil 59 and the welding loops 48. During such movement, the inner coil 61 is supplied with electrical energy from the generator 60. The distribution of energy to the various welding loops 48 is obtained by the mercury switches 53 which are actuated by the tripping mechanism 56 or an extension thereof. By properly selecting the arcuate length of the tripping mechanism, a group of three tools can be supplied with energy over a rotational angle of about 30 degrees. After the welding operation is completed, the welded container and the welding tools 48' move into a cooling stage.

It will be understood that the embodiments described herein are merely exemplary and that persons skilled in the art may make many variations and modifications without departing from the spirit and scope of the invention. For instance, the mercury switches described and illustrated with respect to the embodiment of FIGS. 8–11 may be replaced by photo-sensitive switches or the like. All such modifications and variations are intended to be included within the scope of the invention as defined in the appended claims.

I claim:

1. Apparatus for the induction welding of containers which are each made from a plurality of substantially plastic components, comprising a plurality of pairs of support members, each pair of support members supporting a corresponding pair of components in positions they are to assume in a completed container and including a first support member movable along a feed path for supporting one of the components in a predetermined position and a second support member movable along said feed path for supporting another of the components substantially independently of said one component and said first support member but in a second predetermined position, which is fixed relative to said first predetermined position, said first and second predetermined positions corresponding to fixed positions said components are to assume in a completed container; a multiplicity of welding tools, each of which is included in one of said first and second support members of a corresponding pair of support members for welding together components supported by said corresponding pair of support members to form a corresponding container; moving means for continuously moving said plurality of pairs of support members along said feed path, said moving means including a generally round table rotatable about a fixed axis of rotation extending generally perpendicular to a plane containing a diameter of said table, said plurality of pairs of support members being mounted on said table in a circular pattern in which said welding tools are spaced apart equidistantly; and energizing means for simultaneously energizing at least a pair of adjacent welding tools which are moving over a predetermined portion of said feed path at one time, whereby a multiplicity of containers may be welded simultaneously, said energizing means including a high-frequency electrical generator, a stationary manifold electrically connected to said generator and arranged radially adjacent to a circumferential outer edge of said table so as to delimit said predetermined portion of said feed path, and a plurality of pairs of spaced-apart rails attached to said circumferential edge of said table, each pair of rails being engageable with said manifold and electrically connected to a corresponding one of said welding tools, said first and second support members of each pair of support members maintaining a corresponding pair of components in said fixed positions during the welding of said corresponding pair of components and thereafter, until the welded area of said corresponding pair of components reaches a predetermined low temperature which is less than the temperature that said welded area normally reaches during welding and sufficiently low to inhibit shrinkage deformation of a container formed from said corresponding pair of component.

2. Apparatus according to claim 1, wherein said feed path is generally arcuate.

3. Apparatus according to claim 1, wherein said energizing means includes a high-frequency electrical generator and a plurality of switch means, each of said switch means being associated with a corresponding one of said welding tools and being rotatable therewith, for controlling the supply of electrical energy from said generator to said welding tools.

4. Apparatus according to claim 3, wherein said generator has an output coil disposed coaxially about said axis of rotation of said table and rotatable with said table.

5. Apparatus according to claim 3, wherein said switch means are closed to permit energization of said welding tools by contact with a stationary tripping mechanism which delimits said predetermined portion of said feed path.

6. Apparatus according to claim 1, wherein said first and second support members of each pair of support members are adjustable in a direction which is substantially parallel to said axis of rotation of said table.

7. Apparatus according to claim 1, wherein each of said first support members is spaced a distance from its corresponding second support member in a direction generally parallel to said axis of rotation of said table.

8. Apparatus according to claim 7, wherein said distance is adjustable.

9. Apparatus according to claim 1, further comprising feeding means for successively feeding components to said first and second support members of each pair of support members.

* * * * *